June 17, 1941.  J. G. EAGLESON  2,245,853
TREE TRANSPLANTING APPARATUS
Filed Aug. 30, 1939  2 Sheets-Sheet 1

INVENTOR
Jesse G. Eagleson
BY Thos. E. Leofield
ATTORNEY

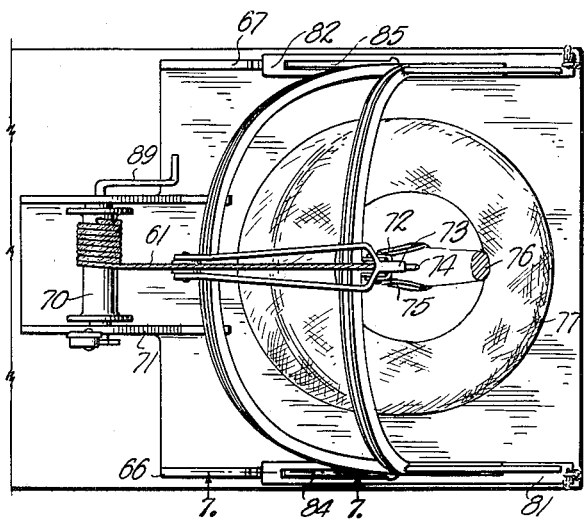
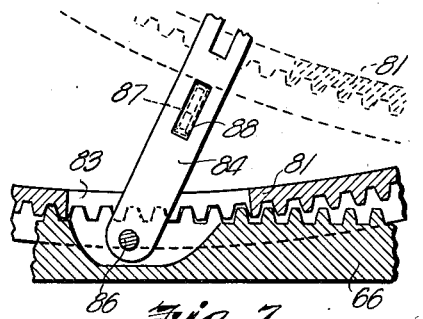
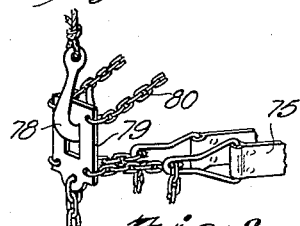
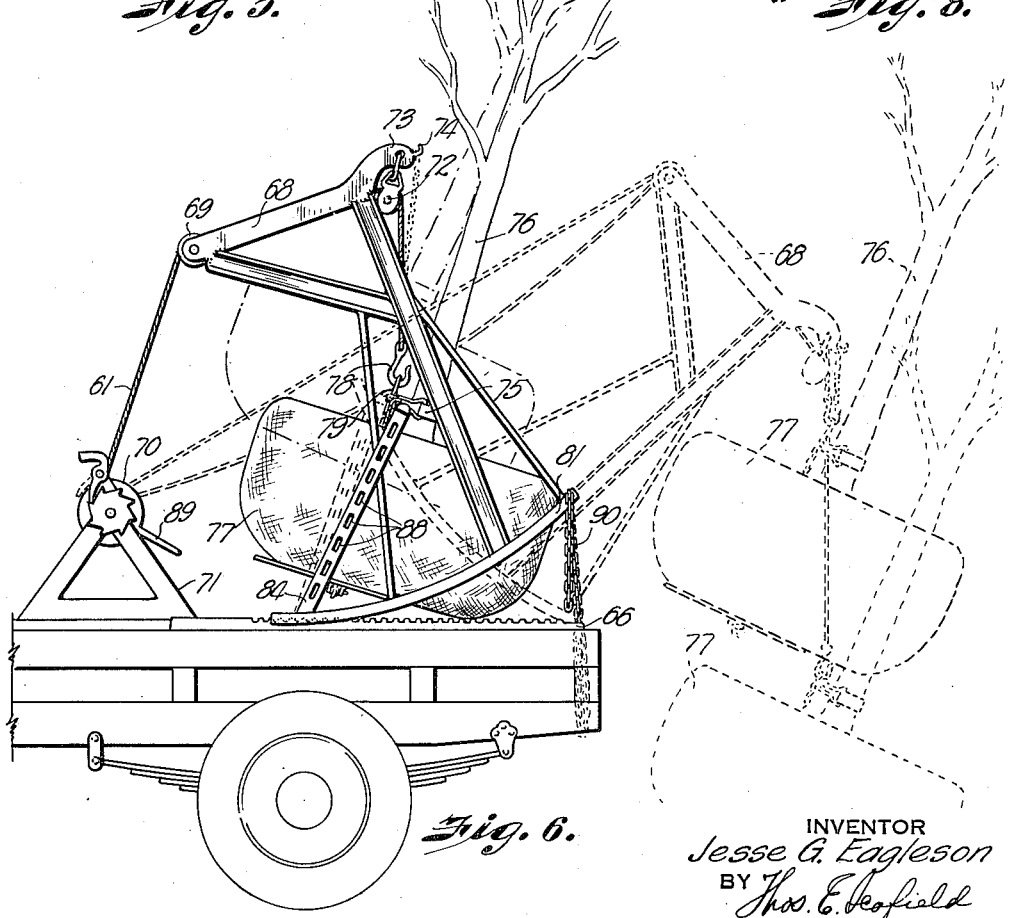

Patented June 17, 1941

2,245,853

UNITED STATES PATENT OFFICE 2,245,853

TREE TRANSPLANTING APPARATUS

Jesse G. Eagleson, Rosedale Station, Kans.

Application August 30, 1939, Serial No. 292,666

4 Claims. (Cl. 214—3)

My invention relates to a tree transplanting apparatus, and more particularly to apparatus for hoisting heavy weights upon a vehicle for transportation, and means for unloading said heavy weights from the vehicle after they have been transported to the desired location.

In the transplanting of big trees, large and heavy balls of earth surrounding the roots must be preserved if the tree is to be successfully transplanted.

One object of my invention is to provide an apparatus for conveniently and expeditiously transplanting large trees.

Another object of my invention is to provide an apparatus for expeditiously and conveniently lifting heavy weights onto a truck or other vehicle, and for unloading said weights from said vehicle.

Other and further objects of my invention will appear from the following description.

In the accompanying drawings which form part of the instant specification, and which are to be read in conjunction therewith, and in which like reference numerals are used to indicate like parts in the various views;

Fig. 5 is a top plan view of a portion of a truck showing another embodiment of my invention.

Fig. 6 is a side elevation of the embodiment shown in Fig. 5.

Fig. 7 is a fragmentary sectional view on a large scale taken along the line 7—7, Fig. 5.

Fig. 8 is a fragmentary perspective view of a detail.

Figure 1:
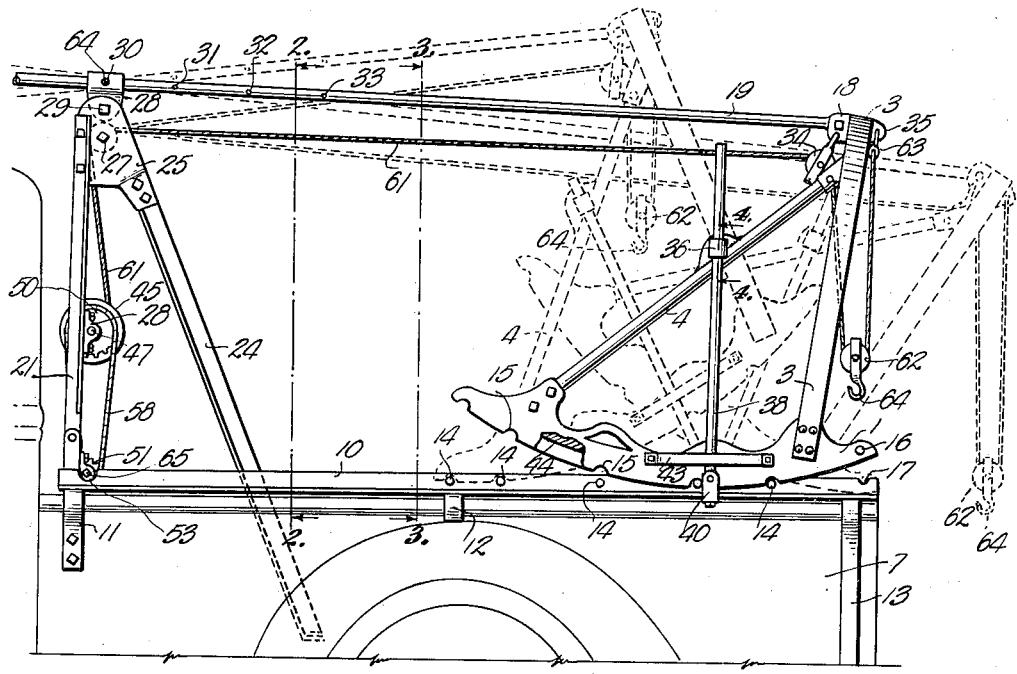
Fig. 1 is a fragmentary side elevation of a truck fitted with one embodiment of my invention.
Figure 3:
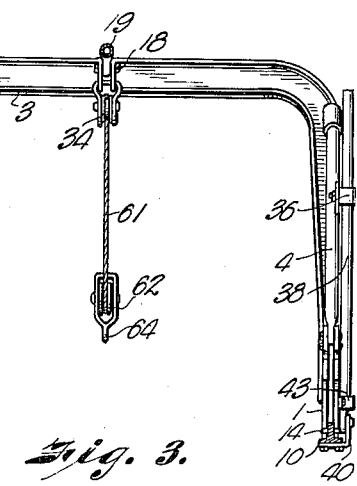
Fig. 3 is a sectional view taken on the line 3—3, Fig. 1.
Figure 4:
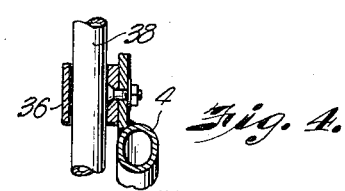
Fig. 4 is a sectional view taken on the line 4—4, Fig. 1.

More particularly, referring now to the drawings, the main supporting element comprises a rocker having a pair of curved feet 1 and 2. A bridge member 3, which may be formed of an I-beam or the like, is bolted, riveted, or otherwise secured, to the rocker feet 1 and 2 adjacent their rear portions. The bridge member 3 is braced by a pair of members 4 and 5, as can readily be seen by reference to Figs. 1 and 3. The truck body 6 is provided with side walls 7 and 8, to which I secure angle irons 9 and 10 by means of straps 11, 12 and 13. A plurality of pins 14 are welded or otherwise secured to each of the angle irons 9 and 10. The rocker feet 1 and 2 are provided with reentrant portions 15 in which the pins are adapted to seat. The rear end of the rocker feet are provided with pins 16 adapted to seat in the reentrant portion 17 formed at the rear ends of the angle irons 9 and 10.

Figure 2:
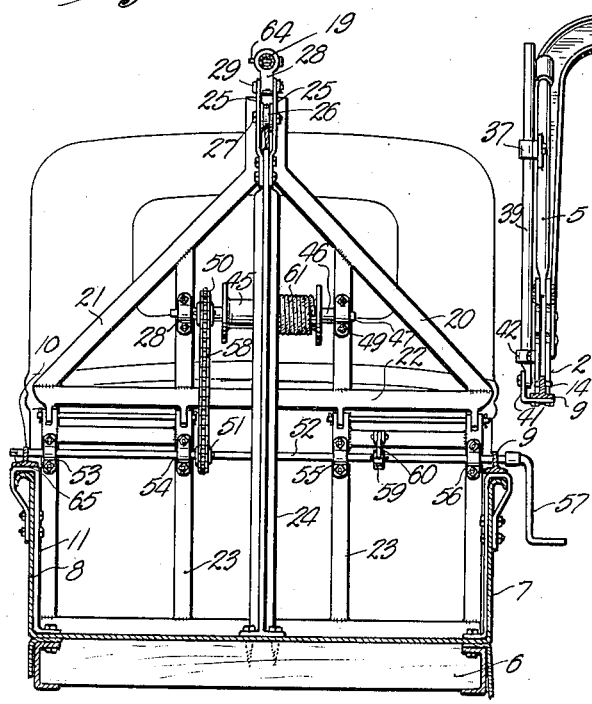
Fig. 2 is a sectional view taken on the line 2—2, Fig. 1.

A bracket 18 is formed centrally of and rearwardly of the rocker bridge 3. A rod 19 is pivoted in the bracket 18 and extends rearwardly. A framework, comprising inclined members 20 and 21, welded to a base member 22 is secured to a framework 23, which is in turn secured to the truck body adjacent its forward end. This can readily be seen by reference to Fig. 2. An inclined bracing member 24 is secured to the floor of the truck body and to the upstanding framework by means of a pair of plates 25. A pulley 26 is pivoted between the plates 25 on a pivot pin 27. A bushing 28 is secured to the plates 25 by means of bolt 29. The bushing 28 is provided with a hole 30 and is adapted to receive the rod or pipe 19. The rod itself is provided with a plurality of holes 31, 32 and 33. A block 34 is hung from the bracket 18. A lug 35 is supported at the rear end of the rocker bridge 3. The members 4 and 5 carry guide bushings 36 and 37. A pair of tubular arms 38 and 39 are pivoted upon brackets 40 and 41. The rocker feet 1 and 2 carry straps 42 and 43. The pivoted guide arms 38 and 39, together with the straps 42 and 43, and the guide bushings 36 and 37, serve to guide the motion of the rocker bridge.

It will be noted that the rocker feet 1 and 2 are formed by a pair of side plates welded or otherwise secured to a curved member 44, the plates projecting downwardly and forming a curved trough into which the webs of the angle irons 9 and 10 project. A gypsy head 45 is secured to a sleeve 46 which is pivoted about a shaft 47. The shaft 47 is secured to the framework by means of brackets 48 and 49. The bushing 46 carries a sprocket wheel 50. A sprocket wheel 51 is keyed to a shaft 52 which is pivoted in brackets 53, 54, 55 and 56. The shaft is provided with a removal crank 57. A sprocket chain 58 interconnects sprocket wheels 50 and 51. The shaft 52 also carries a ratchet 59 adapted to coact with a pawl 60. One end of a cable 61 is secured to the gypsy head 45 and is rove around the gypsy head over pulley 26, over block 34, downwardly through movable block 62, and upwardly to a hook 63, by which the other end of the cable is secured to the lug 35. The block 62 is provided with a hook 64.

In operation, when it is desired to hoist a tree or heavy weight onto a truck, a pin 64, which secures the rod 19 in the bushing 30, is removed. The pawl 60 is lifted clear of the ratchet 59, the crank 57 having been inserted on one of the squared ends 65 of the shaft 54 is rotated to unwind the cable or rope 61. The weight of the rocker bridge construction will rotate it rearwardly bringing it into the lower dotted line position shown in Fig. 1. During this movement the rod 19 will slide in the bushing 30. When the rocker bridge is in the desired position projecting outwardly over the rear end of the truck, and one of the holes in the rod 19 is in alignment with the opening 30, the pin 64 is reinserted locking the rocker bridge in the desired position. The further unwinding of the cable 61 will lower the movable block 62 and hook 64 to a point adjacent the ground. The hook is then secured to the weight to be lifted, which in the case of a tree will be to a strap or band located adjacent the ball of earth. The crank 57 is then operated to hoist the weight. When the weight is hoisted a sufficient distance, the pin 64 is removed from the bushing 30. This frees the rod 19. The weight upon the rocker bridge tending to rock it rearwardly is resisted by tension upon the cable 61.

After the pin 64 has been removed the crank is again operated in a hoisting direction. Since the rocker bridge member is now free to rock, further winding of the cable upon the gypsy head 45 will rock the rocker bridge member forwardly of the truck allowing the heavy weight to swing inwardly to the upper dotted line position shown in Fig. 1. When in this position, the weight will have been moved above the truck body proper. The position is such that one of the holes, say 33, is in alignment with the opening 30 of the bushing. At this position the pin 64 is again inserted to lock the rod 19 to the bushing. The crank 57 is then operated to lower the weight onto the truck floor. It will be seen that the construction is such that in its forward position the rocker bridge will clear the trunk of a tree projecting upwardly, permitting the ball of earth to rest upon the truck body. The lowering of the heavy weight onto the truck body lowers the center of gravity, and it is in this position that the heavy weight is moved.

In unloading, the procedure is reversed. The crank is operated to lift the heavy weight upwardly off of the truck body. Then the pin 64 is removed. The crank is then moved to unwind the cable from the drum or gypsy head 45. Since the rod is free to move in the bushing 30 the rocker bridge structure will rock rearwardly rather than permit the weight to lower. This rocking motion carries the weight outwardly over the rear end of the truck. The pin 64 is again reinserted to lock the rod 19 to the bushing 30 and further unwinding of the cable 61 will result in the lowering of the weight to the earth.

Referring now to Figs. 5, 6, 7 and 8, I have shown another embodiment of my invention in which, instead of the rod and bushing structure, I employ a different arrangement.

The rocker bridge structure is of the same general nature, though instead of using pins and reentrant portions I employ gear tracks 66 and 67. The rocker bridge is provided with a rearwardly extending arm 68 supporting a pulley 69, which gives a fair lead to the cable 61 which is wound upon the drum 70 of a winch 71.

The pulley 72 is hung from a projecting lug 73 which is provided with a hook 74. Having the operation of the embodiment shown in Figs. 1 and 2 in mind, the construction and operation of the embodiment shown in Figs. 5, 6 and 7, can best be understood from a description of its operation. Let us assume that it is desired to hoist a tree or other heavy weight. A sling 75 is passed around a tree trunk 76, the tree being provided with the usual ball of earth 77. The hook 78 of the hoisting arrangement is hooked into a convenient portion 79 of the sling. The member 79 is also provided with a chain 80. The rocker bridge structure will have been moved to its dotted line position of Fig. 6, and the hook 78 have been hooked onto the sling 75.

By reference to Fig. 7 it will be noted that the rocker feet 81 and 82 are provided with slots 83, through which project pivoted arms 84 and 85. The arms 84 and 85 are pivoted to the gear tracks 66 and 67 by means of pins 86, as can readily be seen by reference to Fig. 7.

Wedges 87 are adapted to be inserted into openings 88 formed in the arms 84 and 85. In the dotted line position in Fig. 6 the forward end of the rocker feet 81 and 82 will be in raised position. The wedges 87 are inserted in the openings 88 projecting underneath the rocker feet, as can readily be seen by reference to the dotted line position of Fig. 7. If desired, the rocker feet may be provided with openings adapted to be moved into alignment with the openings 88 and the wedges inserted through both openings to immobilize the rocker structure.

With the wedges in place, the winch 71 is operated through its crank 89 to hoist the tree to be transplanted to the upper dotted line position shown in Fig. 6. The wedges will prevent the rocker bridge structure from pivoting forwardly during the hoisting operation. The chain 80 is then hooked onto the hook 74 and the winch operated to back off the cable slightly to take a strain upon the chain, and simultaneously easing the strain from the wedges which have been placed under the rocker feet. The wedges may then be removed. The crank 89 is then operated to wind the flexible member 61 upon the drum 70. This causes the rocker bridge structure to rock forwardly swinging the parts to their full line position in Fig. 6. Chains 90, the lower ends of which are secured to the truck body, are then hooked over the after-ends of the rocker feet. Further rotation of the crank 89 will tend to two-block the hook 78 thus relieving the strain from the chain 80. When the strain is off the chain 80, it is unhooked from the hook 74. The winch is then operated to lower the ball and tree to the floor of the truck body. In this position the tree is moved to the desired location.

When it is desired to remove the tree from the truck the winch is operated to raise the tree upwardly until the chain 80 can be hooked over the hook 74. The chains 90 prevent the rocker bridge structure from rocking forwardly during this operation. Then the winch is operated to unwind the cable. As the unwinding proceeds the weight will be borne by the chain 80. This will rock the rocker bridge structure rearwardly to the upper dotted line position in Fig. 6. The wedges 87 are then placed underneath the rocker feet and a strain again taken on the cable 61. When the strain is relieved from the chain 80 it is unhooked and then the winch is operated to lower the tree to the ground.

It will be seen that I have accomplished the objects of my invention. I have provided a tree transplanting apparatus which enables me to move a tree in a vertical position or in a horizontal position as I may desire. The ball of earth may be set on the truck in any position. My apparatus may be operated with a single winch. Due to the fact that the track is elevated the ball of earth may be set below the track to a position where it will lower the center of gravity, thus facilitating the movements of the truck. The movement of the tree or heavy weight onto and off of the truck is substantially automatic due to the rocker bridge construction. The weight of the tree or weight itself supplies the force moving the tree rearwardly off of the truck.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In a tree transplanting device, a vehicle having a body, a pair of tracks on said body, a pair of arcuate members carried by said tracks, a bridge member supported by said arcuate members, hoisting means carried by said vehicle including means supported centrally of and by said bridge member, the construction being such that said arcuate members may be rocked on said tracks to move the bridge member to a position projecting from said vehicle body, means for holding said bridge member in said projecting position during the hoisting operation, and separate means for holding said bridge member in inboard position.

2. In a tree handling device, a vehicle having a body, a pair of tracks on said body, a pair of arcuate members carried by said tracks, coacting means on said tracks and arcuate members respectively for preventing sliding movement therebetween while permitting rolling movement, a bridge member supported by said arcuate members, hoisting means carried by said vehicle including means supported centrally of and by said bridge member, the construction being such that said arcuate members may be rocked on said tracks to move the bridge member to a position projecting from said vehicle body, means for holding said bridge member in said projecting position during the hoisting operation, and separate means for holding said bridge member in inboard position.

3. In a tree handling device, a vehicle having a body, a floor for said body, a pair of tracks, means for supporting said tracks above said floor, a pair of arcuate members carried by said tracks, a bridge member supported by said arcuate members, hoisting means carried by said vehicle, including means supported centrally of and by said bridge member, the construction being such that said arcuate members may be rocked on said tracks to move the bridge member from a position over said vehicle floor to a position projecting from said vehicle body, means for holding said bridge member in said projecting position during the operation of said hoising means to move a weight to a position supported by said bridge member, said holding means being readily releasable whereby further operation of said hoisting means will rock said bridge member from projecting position to a position over said vehicle floor, and means for holding said bridge member in said position over said vehicle floor whereby a weight carried by said bridge member may be lowered to said vehicle floor for transportation by said vehicle.

4. In a tree handling device, a vehicle having a body, a pair of tracks on said body, a pair of arcuate members carried by said tracks, a bridge member supported by said arcuate members, hoisting means carried by said vehicle including means supported centrally of and by said bridge member, the construction being such that said arcuate members may be rocked on said tracks to move the bridge member from a position over said vehicle body to a position projecting from said vehicle body, an elongated member having a portion thereof secured to said bridge member and projecting therefrom, and readily releasable means supported by said vehicle body, coacting with said elongated member for immobilizing the same, whereby said bridge member may be secured in any desired position.

JESSE G. EAGLESON.